Jan. 29, 1935.  H. W. COLLINS ET AL  1,989,634
GLASS TILE AND BUILDING BLOCK
Filed Aug. 12, 1933
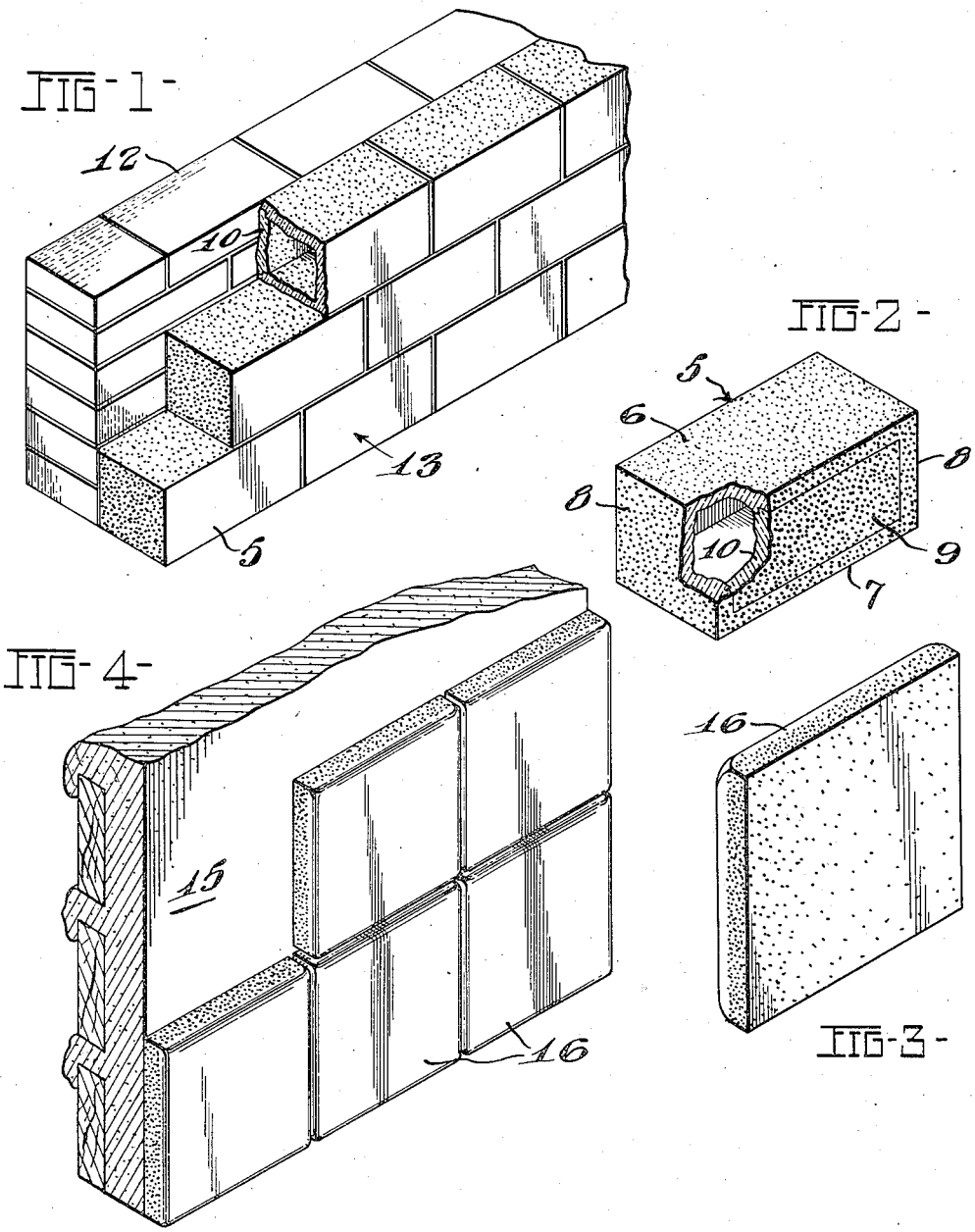

Patented Jan. 29, 1935

1,989,634

UNITED STATES PATENT OFFICE 1,989,634

GLASS TILE AND BUILDING BLOCK

Howard W. Collins and Eloy Ruiz, Columbus, Ohio, assignors to Owens-Illinois Glass Company, a corporation of Ohio Application August 12, 1933, Serial No. 684,836

8 Claims. (Cl. 72—18)

Our invention relates to building units made of glass or similar transparent or light transmitting materials, including glass tile, building blocks and the like, which may be used, for example, for surfacing walls of buildings, and may serve for both utilitarian and decorative purposes.

An object of our invention is to provide tiles or blocks of the character indicated which are colored in a manner to produce particularly artistic coloring effects and at the same time protect the coloring material from exposure, and, moreover, to conceal the mortar or other backing covered by said blocks or tile, thus hiding any imperfections in said backing material.

Other objects of the invention will appear hereinafter.

In the accompanying drawing:

Fig. 1 is a fragmentary perspective view of a wall having a facing of hollow glass blocks constructed in accordance with our invention.

Fig. 2 is a perspective view of a hollow glass block with a portion broken away.

Fig. 3 is a perspective view of a glass tile.

Fig. 4 is a perspective view showing a portion of a wall with tile applied as a facing thereto.

Referring particularly to Fig. 2, a hollow rectangular building block 5 is shown comprising a top surface 6, bottom surface 7, end surfaces 8 and back surface 9. The block, as shown, is made of transparent glass. The top, bottom, front and end walls thereof, as shown, are made in a single piece, the rear wall comprising a separate plate or lid 10 sealed in position.

Referring to Fig. 1, we have shown a wall 12 which may be built, for example, of brick with a facing built of glass blocks 5. The outer or exposed faces 13 of these blocks are preferably plain, providing a wall surface of plain transparent glass. In accordance with our invention, the other surfaces of the block including the top, bottom, ends and rear faces, are colored in a manner to give the block, when built into a wall, the appearance of being colored, owing to the transmission of the color through the glass walls of the block. This coloring may be obtained, for example, by the use of a cement-paint applied to the five surfaces of the block which are to be colored.

Another method which may be employed for coloring the blocks consists in fusing a coloring material into the surface portions of the block. This may be done by introducing a powdered coloring material into an intensely hot flame which is directed against the surface which is to be colored, thereby softening a surface layer of the glass and causing the coloring material to be fused and integrally united with said surface layer. Such a method is disclosed, for example, in the copending application of Games Slayter, Serial Number 622,560, filed July 14, 1932.

Still another method of coloring the blocks consists in the use of glass of the desired color, reduced to powdered form and applied in the form of a paste or the like to the surfaces to be colored and then subjected to localized heat of sufficient intensity to fuse and integrally unite the colored glass with the surface portion of the block. Such a method is disclosed in the United States patent to Games Slayter, No. 1,949,884, dated March 6, 1934. Other methods might be employed.

By the application of color to the five sides of the block which are not exposed, leaving the front exposed face of the block plain and uncolored, particularly pleasing effects are obtained. The color is transmitted through the transparent glass and gives the entire block the appearance of being colored. The effect of the transmission, refraction and radiation of the light produced by the transparent glass, gives a particularly pleasing appearance to the blocks and to the wall which is built of or surfaced by said blocks. A brilliancy as well as permanency of color is obtained, which cannot be obtained by the use of coloring material applied to the exposed exterior surface or by the use of blocks made of colored glass. The surfaces to which the color is applied are also fully protected against exposure to weathering or mechanical injury. Further, any imperfections in the mortar or material which forms a backing for the blocks, are hidden by the coloring material on the back surfaces 9 of the blocks.

Figs. 3 and 4 illustrate the invention in connection with glass tile used to form a surfacing for a wall 15. Each tile 16 consists of a solid rectangular block or piece of glass having its rear surface and its four edge surfaces colored. The coloring may be effected in the manner above described in connection with the building blocks 5. The coloring of the tile serves the same purposes as above noted in connection with the building blocks 5 and gives similar artistic and pleasing lighting and coloring effects.

Modifications may be resorted to within the spirit and scope of our invention.

We claim:

1. A tile made of transparent glass and having a plain clear front surface and having its back surface and edge surfaces colored with vitreous coloring material fused into the glass.

2. A hollow rectangular building block made of transparent material, said block having one face free from color and the remaining five faces colored.

3. A rectangular building block made of transparent clear glass, and a coloring material forming a surface coating for five sides of said block, the sixth side being uncolored.

4. A wall comprising a backing of masonry and a surfacing of transparent glass blocks, each of said blocks having its outer exposed surface clear and having a coloring material covering the back, top, bottom and end surfaces of the block, the top, bottom and end surfaces of each block abutting the bottom, top and end surfaces, respectively, of adjoining blocks.

5. The combination of a wall and a tile facing therefor, said facing comprising solid, rectangular tiles made of transparent glass, said tiles having their edges and back surfaces colored and their front faces plain and clear.

6. The combination of a wall and a tile facing therefor, said facing comprising solid, rectangular tiles made of transparent glass, said tiles having their back surfaces and edges painted and their front faces clear, permitting the color to be transmitted through the glass.

7. The combination of a wall and a facing therefor, said facing comprising hollow rectangular building blocks made of transparent glass, said blocks having their front faces clear and having their top, bottom, end and rear surfaces colored, said blocks arranged in horizontal rows with the top, bottom and end surfaces of each block abutting the bottom, top and end surfaces, respectively, of adjoining blocks.

8. A wall comprising a backing of masonry and a surfacing of blocks made of transparent glass, each said block being hollow and of rectangular formation and having five sides thereof made in a single piece and a sixth side comprising a separate plate sealed into the block, said blocks being laid in horizontal rows with said plates bearing against the said backing, the outer faces of said blocks being clear and the top, bottom, end and rear surfaces being colored, whereby the color is reflected through the body of the blocks and gives color to the exposed surface of the wall.

HOWARD W. COLLINS.
ELOY RUIZ.